United States Patent
Takahashi et al.

(10) Patent No.: US 7,175,887 B2
(45) Date of Patent: Feb. 13, 2007

(54) METHOD OF COATING A FLUOROCARBON RESIN

(75) Inventors: Toru Takahashi, Chiba (JP); Toshio Watakabe, Chiba (JP); Akira Matsuno, Chiba (JP)

(73) Assignee: Calsonic Compressors Manufacturing Inc. (JP)

( * ) Notice: Subject to any disclaimer, the term of this patent is extended or adjusted under 35 U.S.C. 154(b) by 0 days.

(21) Appl. No.: 10/281,037

(22) Filed: Oct. 25, 2002

(65) Prior Publication Data
US 2003/0091746 A1    May 15, 2003

(30) Foreign Application Priority Data

| Oct. 26, 2001 | (JP) | ............................. 2001-329759 |
| Oct. 26, 2001 | (JP) | ............................. 2001-329762 |
| Oct. 16, 2002 | (JP) | ............................. 2002-302012 |

(51) Int. Cl.
*B05D 3/06* (2006.01)
*C08J 7/18* (2006.01)

(52) U.S. Cl. .................. 427/554; 427/555; 427/556

(58) Field of Classification Search ................ 427/553, 427/554, 555, 556
See application file for complete search history.

(56) References Cited

U.S. PATENT DOCUMENTS 3,765,853 A * 10/1973 Riebling ..................... 65/21.3
3,970,055 A *  7/1976 Long ......................... 123/43 A
4,051,275 A    9/1977 Forestek ..................... 427/201

(Continued)

FOREIGN PATENT DOCUMENTS

EP    0624404    11/1994

(Continued)

OTHER PUBLICATIONS

Patent Abstracts of Japan vol. 1998, No. 08, Jun. 30, 1998 & JP 10 058595 A (Nikken Toso Kogyo KK), Mar. 3, 1998 *abstract*.

(Continued)

*Primary Examiner*—Bret Chen
(74) *Attorney, Agent, or Firm*—Adams & Wilks

(57) ABSTRACT

A first member is configured to undergo sliding contact with a surface of a second member. The surface of the first member is roughened by irradiating the surface of the first member with a laser to form first recesses in the surface of the first member. The surface of the first member is then cleaned followed by a finely roughening step of irradiating the first recesses formed in the surface of the first member with a plasma to form second recesses which are shallower than the first recesses. Thereafter, a fluorocarbon resin is coated on the surface of the first member so that the fluorocarbon resin securely contacts and adheres to the surface of the first member due to the rough and clean state thereof. The surface of the first member is then subjected to a heat treatment.

7 Claims, 14 Drawing Sheets

U.S. PATENT DOCUMENTS

| | | | |
|---|---|---|---|
| 5,358,604 A * | 10/1994 | Lin et al. | 216/17 |
| 5,650,900 A * | 7/1997 | Wei et al. | 360/135 |
| 5,670,010 A | 9/1997 | Hagiwara et al. | 156/330.9 |
| 5,670,216 A * | 9/1997 | Oak et al. | 427/455 |
| 5,731,070 A * | 3/1998 | Endo et al. | 428/216 |
| 5,759,419 A * | 6/1998 | Mochida et al. | 216/22 |
| 5,830,539 A | 11/1998 | Yan et al. | 427/551 |
| 5,869,188 A | 2/1999 | Priebe et al. | 428/457 |
| 5,975,772 A * | 11/1999 | Imai et al. | 396/575 |
| 6,087,009 A * | 7/2000 | Bultykhanova | 428/421 |
| 6,303,897 B1 * | 10/2001 | Bady et al. | 219/121.65 |
| 6,406,601 B1 * | 6/2002 | Kim et al. | 204/298.26 |

FOREIGN PATENT DOCUMENTS

| | | |
|---|---|---|
| WO | 94014904 | 7/1994 |
| WO | 01036342 | 5/2001 |

OTHER PUBLICATIONS

Patent Abstracts of Japan vol. 0060, No. 33 (M-114), Feb. 27, 1982 & JP 56 147962 A (Tokyo Silicone KK), Nov. 17, 1981 *abstract*.

* cited by examiner

DIRECTION OF LASER IRRADIATION

LASER OUTPUT VS DOT DIAMETER

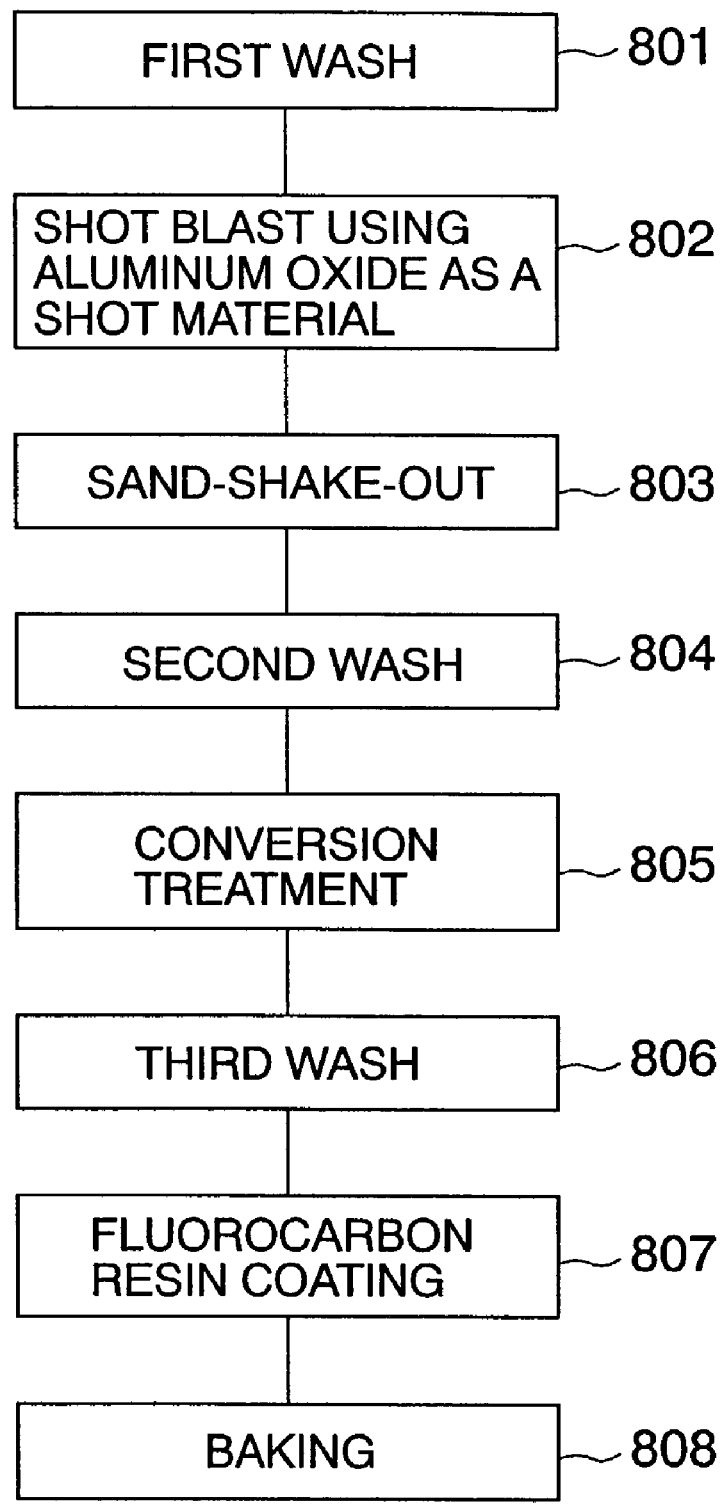

METHOD OF COATING A FLUOROCARBON RESIN

BACKGROUND OF THE INVENTION

1. Field of the Invention

The present invention relates to a method of coating a fluorocarbon resin, a sliding member coated with a fluorocarbon resin using such a method, and a gas compressor having such a resin-coated sliding member.

2. Description of the Related Art

Typically, the respective sliding surfaces of sliding members capable of sliding on each other are required to have wear resistance and seizing resistance. For a vehicle gas compressor of a car air conditioner, for example, significant reduction in weight is often required for its structural components. In this case, therefore, the sliding member may be made of a light-weight material such as an aluminum alloy or the like.

Even though the use of an aluminum alloy or the like achieves the light weight, the surfaces of the sliding members exhibit poor wear resistance and seizing resistance when they slide on each other. Therefore, there may be a case where a fluorocarbon resin such as polytetrafluoroethylene (PTFE) may be coated on the sliding surface of one sliding member. Such a coating avoids poor lubrication, wear, and seizing, which can be caused by the sliding movement between sliding members made of the same metal.

In the case of the fluorocarbon resin coating, there is a need to provide a strong adhesion between the aluminum alloy or the like and the fluorocarbon resin coating layer formed on a base material, for preventing such layer from being detached from the base material by a sliding movement. For improving the adhesion between them, several attempts have been conducted in the prior art. In JP 2000-170657 A (paragraph number 0020, FIG. 2), for example, there is disclosed an invention for making the coating layer itself be easily adhered to an aluminum alloy or the like, in which a coating layer comprised of a fluorocarbon resin and a binder is applied on the surface of a piston made of an aluminum alloy in a swash plate type compressor to attain a strong adhesion between the Al alloy and the coating layer through the binder.

For attaining an improvement in adhesion by providing a coating substrate such as an aluminum alloy with a rough surface, an invention in which this is achieved by etching procedures has been proposed, for example in JP 5-209300 A (Claims) and JP 6-65799 A (paragraph numbers 0014–0018, FIG. 3). In addition, there has been proposed an invention in which this is achieved by means of improvement of coating layer in addition to the etching procedures, for example in JP 5-84468 (paragraph numbers 0008, FIG. 2). Although each of these conventional techniques for improving the adhesion is somewhat effective, its effect is not satisfactory for application to the sliding surface of a sliding member that performs a sliding movement under severe load conditions.

For attaining an improvement in adhesion by providing a coating substrate such as an aluminum alloy with a rough surface, furthermore, there has been proposed an invention in which this is achieved by shot-blasting, for example in JP 2001-263226 A (paragraph numbers 0038–0040).

The fluorocarbon resin coating, which includes a step of surface-roughening with shot-blasting, is generally performed by the process shown in FIG. 15.

In FIG. 15, at first, a base material such as an aluminum alloy is washed in the step of a substrate-treatment (first wash, 801). Then, the washed base material is subjected to shot-blasting using a shot material such as fine particles of hard aluminum oxide of several tens of micrometers in diameter (802) to roughen and clean the surface of the base material. Such a step of surface-roughening and cleaning improves the adhesion between the surface of the base material and the fluorocarbon resin coating and the base material.

Next, the shot material is removed from the surface of the base material (sand shakeout, 803) and is then washed (second wash, 804). Then, the surface of the base material, which has been roughened and cleaned, is subjected to a chemical conversion treatment (805) for preventing the surface from oxidation and so on. Subsequently, the surface of the base material is washed again (third wash, 806) and is then subjected to the steps of fluorocarbon resin coating (807) and baking (808), completing coating of the fluorocarbon resin on the surface of the base material.

The shot-blasting is a process of impinging shot materials upon the surface of the base material, so that minute unevennesses can be formed on that surface. Therefore, the fluorocarbon resin can be introduced into minute concave portions to allow a significant improvement in adhesion property.

The shot material to be used in the above shot-blasting is introduced deep into the minute gaps formed on the base material at the time of performing the shot-blasting (802), so that it often cannot be completely removed by the subsequent steps of sand shakeout (803) and second wash (804). Furthermore, if the base material is a casting product, the shot material, in particular, can easily remain since there are many minute gaps.

Furthermore, the hard shot material remaining in the base material coated with the fluorocarbon resin can be used by being incorporated into a product, for example a gas compressor or the like.

The residual shot material can be left out of the shot material by operation (e.g., a rotation of a rotor or a jet flow of an inner fluid) of the above product in use. The removed hard shot material is then introduced into a sliding portion or the like of the product, so that a coating layer or a metallic part of the sliding portion or the like may be damaged and eventually baked, resulting in disabled operation.

The conventional method of coating a fluorocarbon resin on a base material made of an aluminum alloy or the like as described above is liable to cause peeling of the coating layer from the base material with an extended period of use. Particularly, such peeling of the coating layer can easily occur when the maximum load is high, the load-change cycle amplitude is large, or the lubricating conditions on startup are poor. For instance, the peeling of the coating layer can easily occur on the sliding surface of a rotor, cylinder, side block, or vane of a vane-type gas compressor.

SUMMARY OF THE INVENTION

The present invention has been completed in consideration of the above disadvantages of the conventional method of coating a fluorocarbon resin. Therefore, it is an object of the present invention to provide a method of coating a fluorocarbon resin, a sliding member coated with a fluorocarbon resin using such a method, and a gas compressor having such a resin-coated sliding member, in which good adhesion can be attained as follows:

(i) no peeling occurs during a sliding movement performed under severe load conditions; and (ii) no shot material, which is used in the treatment of a coating substrate, remains in a base material made of an aluminum alloy or the like near the coating layer so that there is no fear that a residual shot material damages the coating layer.

For attaining the above object, a method of coating a fluorocarbon resin according to the present invention comprises: a shot-blasting step of shot-blasting a water-soluble shot material such as sodium bicarbonate or vaporizable shot material such as dry ice onto the surface of a coating target work piece such as a sliding member; a washing step of washing the coating target work piece having its surface roughened by the shot-blasting step; a fluorocarbon resin coating step of coating a fluorocarbon resin on the surface of the coating target work piece washed by the washing step; and a baking step of baking the surface of the coating target work piece on which the fluorocarbon resin is applied by the fluorocarbon resin coating step.

In addition, the method of coating a fluorocarbon resin according to the present invention may further comprise between the washing step and the fluorocarbon resin coating step an additional fine roughening and cleaning step of finely roughening and cleaning the surface of the coating target work piece to further increase contact and adhesion properties of the resulting product.

Furthermore, the method of coating a fluorocarbon resin according to the present invention may further comprise steps of roughening the surface of the coating target work piece by locally heating and melting the surface; coating a fluorocarbon resin on the surface of the coating target work piece which has been roughened by the heating and melting; and baking the coating surface of the coating layer on which the fluorocarbon resin is coated by the above step of coating the fluorocarbon resin.

Further, a method of coating a fluorocarbon resin according to the present invention comprises: a laser irradiation step of irradiating the surface of a coating target work piece with a laser; a fluorocarbon resin coating step of coating a fluorocarbon resin on the surface of the coating target work piece to which the laser has been irradiated; and a baking step of baking the surface of the coating target work piece on which the fluorocarbon resin is coated by the fluorocarbon resin coating step.

In addition, the method of coating a fluorocarbon resin of the present invention may further comprise between the laser irradiation step and the fluorocarbon resin coating step an additional fine roughening and cleaning step of finely roughening and cleaning the surface of the coating target work piece to further improve contact and adhesion properties of the resulting product.

In the method of coating a fluorocarbon resin according to the present invention, the laser irradiation step comprises intermittently irradiating the laser on the surface of the coating target work piece while scanning the laser thereon, thus facilitating an adjustment of the surface roughness of the coating target work piece to a desired condition.

In the method of coating a fluorocarbon resin according to the present invention, the irradiation rate of the laser irradiation may be set to 44% or higher, so that the time required for the roughening treatment can be shortened and also excellent contact and adhesion properties can be obtained.

In the method of coating a fluorocarbon resin according to the present invention, a scanning line of the laser irradiation may be in a spiral form, so that the scanning movement of the laser can be performed continuously and smoothly in an efficient manner to provide an excellent contact of the fluorocarbon resin coating.

In the method of coating a fluorocarbon resin according to the present invention, the laser irradiation step uses a YAG laser as a source of laser light to increase the irradiation rate of the laser irradiation.

Still further, a method of coating a fluorocarbon resin according to the present invention comprises: a plasma irradiation step of irradiating plasma on the surface of a coating target work piece to finely roughen and activate the surface thereof; a fluorocarbon resin coating step of coating a fluorocarbon resin on the surface of the coating target work piece which has been irradiated with the plasma in the plasma irradiation step; and a baking step of baking the surface of the coating target work piece on which the fluorocarbon resin is applied by the fluorocarbon resin coating step.

The method coating a fluorocarbon resin according to the present invention may further comprise an additional roughening and cleaning step of roughening and cleaning the surface of the coating target work piece prior to the plasma irradiation step, to thereby obtain a stronger fluorocarbon resin coating.

In the method of coating a fluorocarbon resin according to the present invention, the roughening and cleaning step comprises shot-blasting a water-soluble shot material or a vaporizable shot material onto the surface of the coating target work piece, or irradiating the surface of the coating target work piece with a laser.

Furthermore, in the present invention, a sliding member, especially a sliding member of a gas compressor, is provided as the coating target work piece described above and is subjected to a coating treatment using the above method of coating a fluorocarbon resin, so that it becomes possible to obtain the sliding member and the gas compressor in which peeling resistance, wear resistance, and durability of their sliding portions are excellent and which have high reliability.

In this invention, the term "irradiation rate of the laser irradiation" refers to a percentage of dot area on which the laser is actually irradiated, relative to the irradiation target surface area. For example, as shown in FIG. 3A, when the laser irradiation is performed by placing the irradiation dots R in a square arrangement in lateral and vertical directions where the spacing between adjacent dots is set at an equal pitch p, the irradiation rate is equal to S/U since four quadrants of different irradiation dots are present in the unit irradiation area U=p×p.

BRIEF DESCRIPTION OF THE DRAWINGS

In the accompanying drawings:

FIGS. 3A, 3B and 3C are a diagram for explaining the surface on which the laser is irradiated in the laser irradiation step during the processing flow of FIG. 2, in which FIG. 3A is an enlarged plan view of the laser irradiation surface, FIG. 3B is a plan view of the laser irradiation surface, and FIG. 3C is a cross-sectional side view of FIG. 3B;

FIG. 15 is an explanatory diagram illustrating a processing flow according to a conventional method of coating a fluorocarbon resin.

DETAILED DESCRIPTION OF THE PREFERRED EMBODIMENTS

Hereinafter, embodiments of the present invention will be described with reference to FIGS. 1 to 14.

First Embodiment

Figure 1:
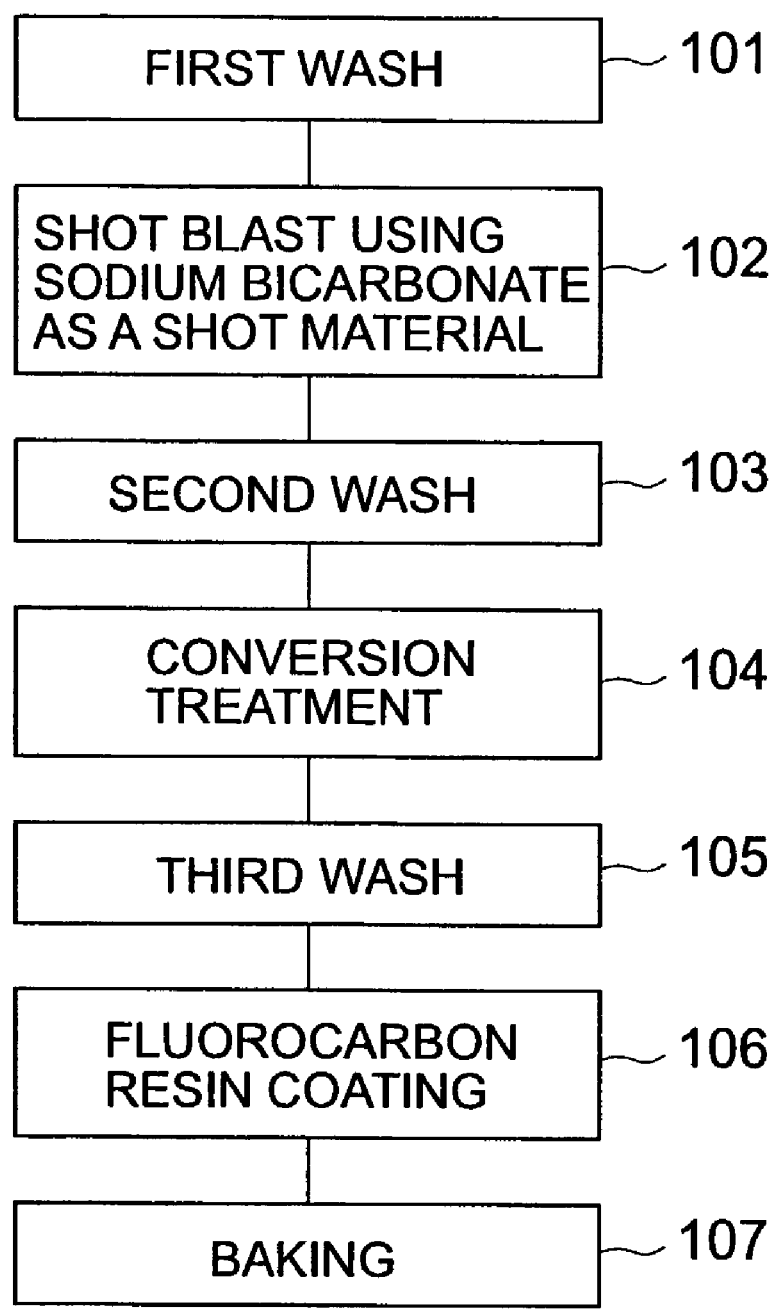
FIG. 1 is an explanatory diagram illustrating a processing flow for a method of coating a fluorocarbon resin in accordance with a first embodiment of the present invention.

Referring now to FIG. 1, there is shown a processing flow representing a first embodiment of a method of coating a fluorocarbon resin according to the present invention.

In FIG. 1, the fluorocarbon resin coating is applied on the surface of a base material made of an aluminum alloy which services a side block of a vehicle gas compressor for a car air-conditioner.

First, the entire surface of the base material of aluminum alloy is washed (first wash, 101). Then, shot-blasting is performed on the surface of the base material which becomes a sliding surface thereof, using sodium bicarbonate $NaHCO_3$ as a shot material, followed by roughening and clearing the shot-blasted surface of the base material (102). The hardness of the shot material of sodium bicarbonate is lower than that of aluminum oxide. However, an advantage of using sodium bicarbonate is that it is soluble in water. Therefore, the shot material can be perfectly dissolved in a washing liquid in the next step of second wash (103). In other words, the shot material that has entered into minute gaps on the base material can flow out to be completely expelled to the outside. In the present embodiment, therefore, there is no need to perform the step of sand shakeout which has been performed in the conventional method.

The base material having the roughened and cleared surface from which the shot material has been completely removed is subjected to the following generally employed process including the steps of chemical conversion treatment for inhibiting oxidation or the like (104), third wash (105), fluorocarbon resin coating (106), and heating or baking (107). Through these steps, the fluorocarbon resin coating can be completed.

Since the fluorocarbon resin coating is performed as described above, there is no shot material that remains on the surface of the base material. Therefore, the durability, lifetime, and reliability of the gas compressor can be increased because there is no fear that the shot material flows out of the base material to the inside of the gas compressor in operation and then damages the sliding portion or the like.

As the water-soluble shot material, there may be used calcium phosphate $Ca_3(PO_4)_2$ or the like in place of sodium bicarbonate $NaHCO_3$. Since the residual shot material is undesirable, a volatile shot material, for example finely granulated dry-ice $CO_2$, may also be used.

Second Embodiment

Figure 2:
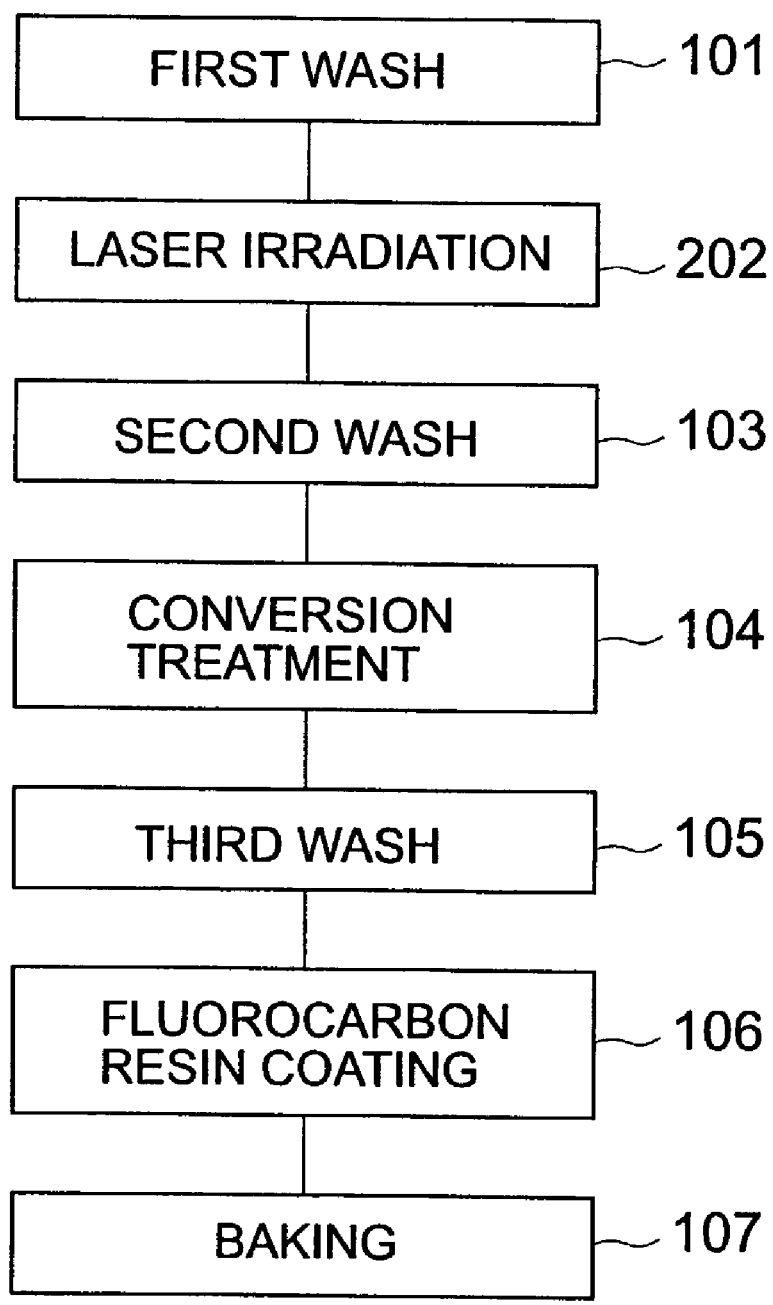
FIG. 2 is an explanatory diagram illustrating a processing flow for a method of coating a fluorocarbon resin in accordance with a second embodiment of the present invention.

Referring now to FIG. 2, there is shown a processing flow representing a method of coating a fluorocarbon resin according to a second embodiment of the present invention.

In FIG. 2, there are illustrated the same steps as those of the first embodiment shown in FIG. 1 except that the laser irradiation step (202) is provided instead of the shot-blasting step (102).

In the laser irradiation step (202), just as in the case with the shot-blasting step (102) in FIG. 1, the surface of the base material that serves as a sliding surface is roughened and cleared to improve contact and adhesion properties with respect to a fluorocarbon resin. In this embodiment, as a matter of course, there is no shot material that remains in the base material because no shot material is used.

Figure 3A:
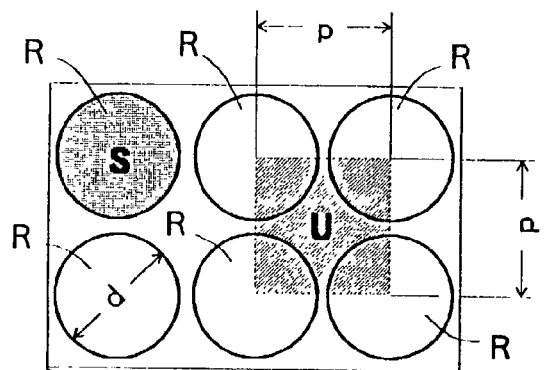

The intensity of laser light beam used in the laser irradiation step (202) is of such a magnitude that the surface of the base material can be slightly melted and roughened. In other words, as shown in FIG. 3A, the laser beams are irradiated such that shallow recessed areas R with a diameter "d" are two-dimensionally arranged at substantially equal pitches "p". Here, the way of arranging these recessed areas R will be more specifically described below.

Figure 3B:
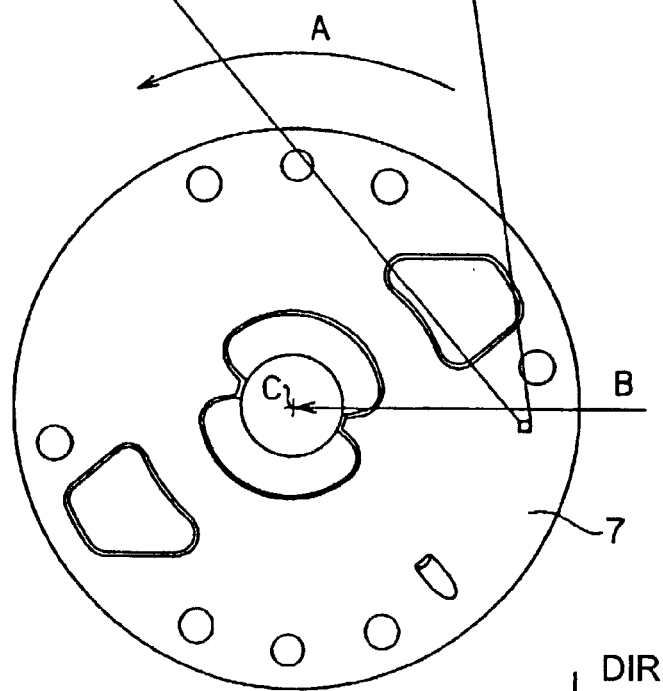
Figure 3C:
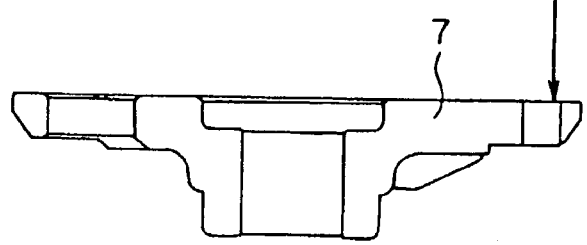

As shown in FIGS. 3B and 3C, a side block 7 of the gas compressor is rotated about its center C in the direction of the arrow A, while the laser beam is moved in a radial direction B of the side block 7. As the laser beam scans the surface of the side block 7 in a spiral manner with equal pitches about the center C, the rotational speed of the side block 7 is adjusted such that the circumferential speed of the spiral scan becomes almost constant, while adjusting the moving speed of the laser beam such that it becomes faster as it moves closer to the center C. On the other hand, the laser light is controlled such that it flashes on and off at a predetermined oscillation frequency by means of Q-switching. Thus, the surface of the side block is locally heated and melted, so that recessed areas R can be formed and arranged as shown in FIG. 3A.

In the case of FIG. 3A, the irradiation rate of the laser irradiation can be represented by: irradiation dot area $S(=\pi d^2/4)$/unit irradiation area $U(=p^2)$.

Alternatively, the recessed areas R can be arranged by various other ways. For example, the side block 7 can be remained at rest while rotating the laser light in a spiral manner to keep the spiral rotation at a constant peripheral speed. Alternatively, furthermore, the frequency of flashing the laser light can be changed while rotating the side block 7 or the laser light at a constant speed. Furthermore, the diameter d of the recessed area R (i.e., the diameter of the dot) and the pitch p of the recessed area R (i.e., the space between the dots) may be selected as appropriate to the extent that roughening and cleaning of the surface may be performed, so that there is no need to distribute the recessed areas R uniformly across the entire surface.

Figure 4:
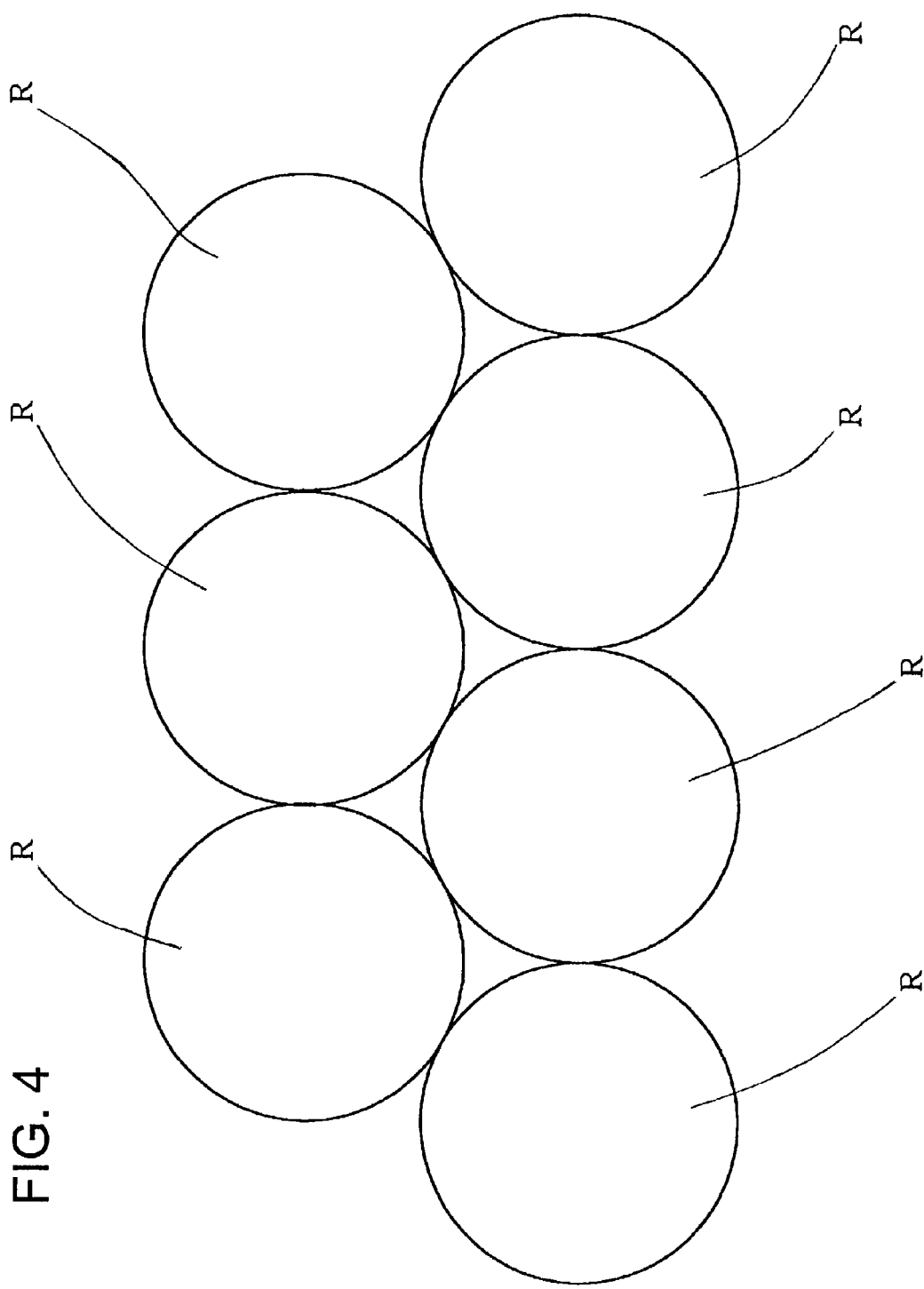
FIG. 4 is an enlarged plan view of another laser irradiation surface.

For instance, as shown in FIG. 4, the irradiated dots R may be arranged in a staggered manner. In the example of FIG. 4, the laser irradiation is effectively performed, while avoiding repetitive irradiation on the same place, such that the adjacent dots arranged in a staggered manner are in contact with one another without overlapping to increase the irradiation rate of the laser irradiation. In this regard, the irradiation rate under the condition where the diameter d of the recessed area R is equal to the pitch p thereof when the laser light is irradiated with the pattern shown in FIG. 3A is about 78.5%, while when the laser light is irradiated with the pattern shown in FIG. 4 it is about 90.7%.

The relationship between the irradiation rate of the laser irradiation and the contact and adhesion of the base material with the fluorocarbon resin was experimentally examined. As a result, a conclusion was drawn that, when the irradiation rate is set to 44% or higher, the contact and adhesion properties are improved so that the base material can exhibit resistance to a sliding friction under high load conditions and hence an excellent durability. Hereinafter, such an experiment will be described with reference to FIGS. 5 to 8.

Figure 5:
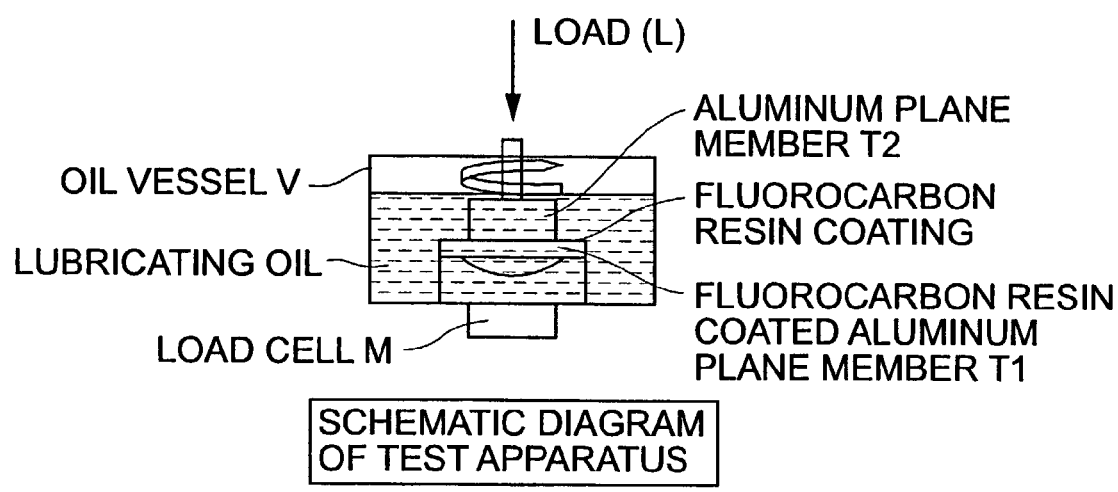
FIG. 5 is an explanatory view illustrating the general configuration of a test apparatus used in a durability test of the contact surface between a base material and a fluorocarbon resin.
Figure 6:
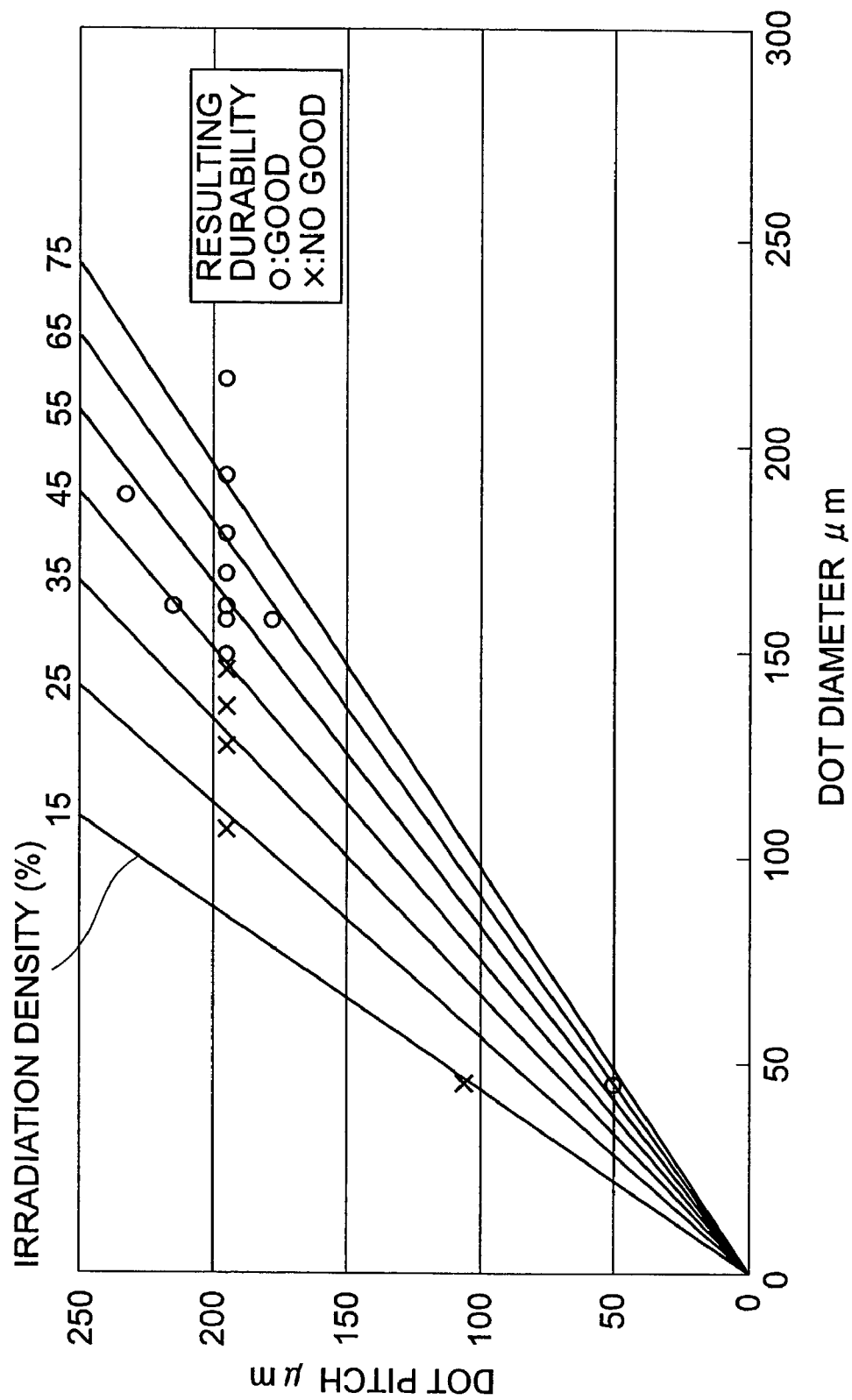
FIG. 6 is an explanatory diagram in which the test results of an aluminum plane member with fluorocarbon resin coating which is used in the test are plotted on a graph such that the diameter of the laser irradiation dot is plotted on a lateral axis and the interval between the dots is plotted on a vertical axis.
Figure 7:
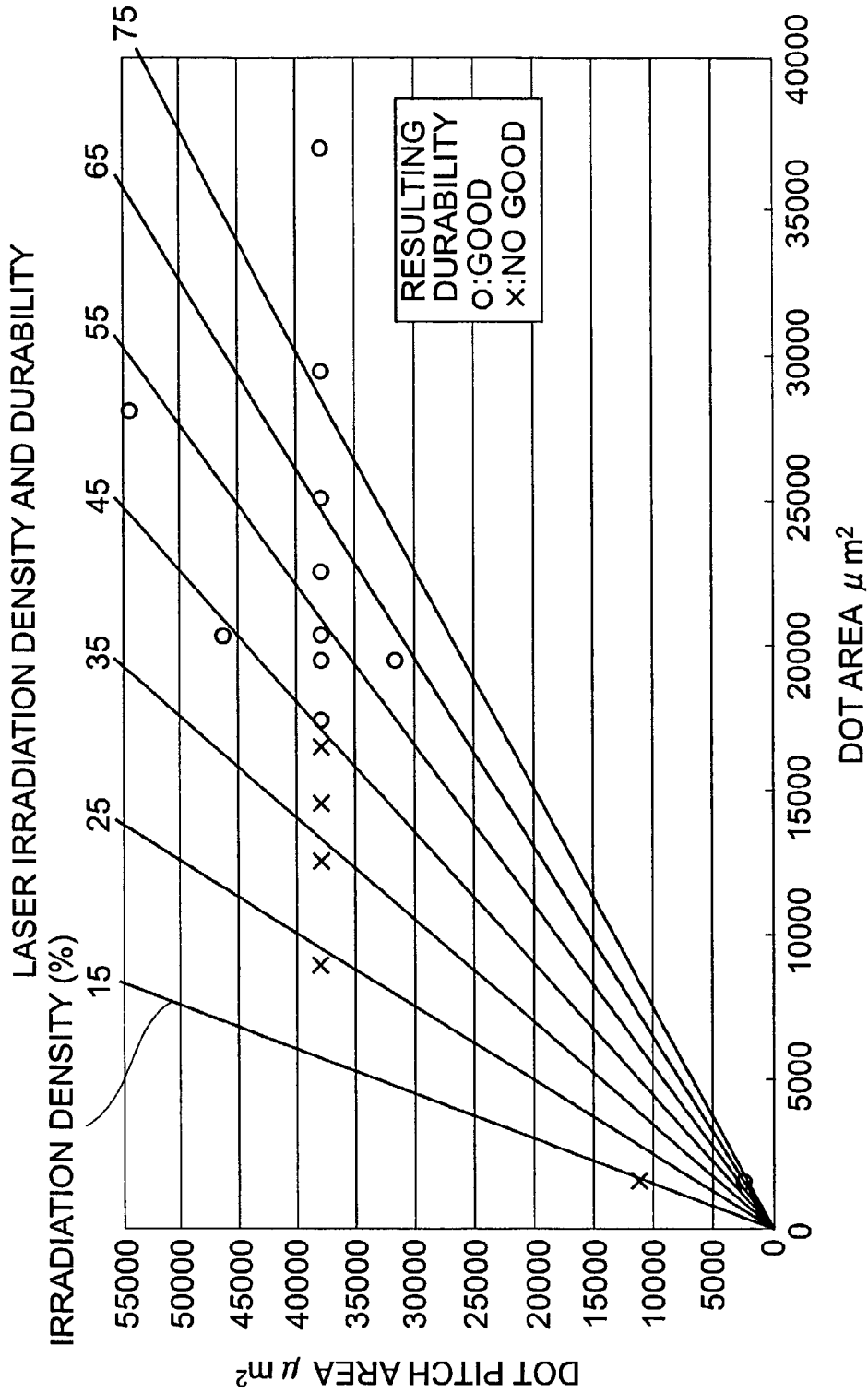
FIG. 7 is an explanatory diagram in which the test results of an aluminum plane member with fluorocarbon resin coating which is used in the test are plotted such that the dot area is plotted on a lateral axis and the unit irradiation target area is plotted on a vertical axis.
Figure 8:
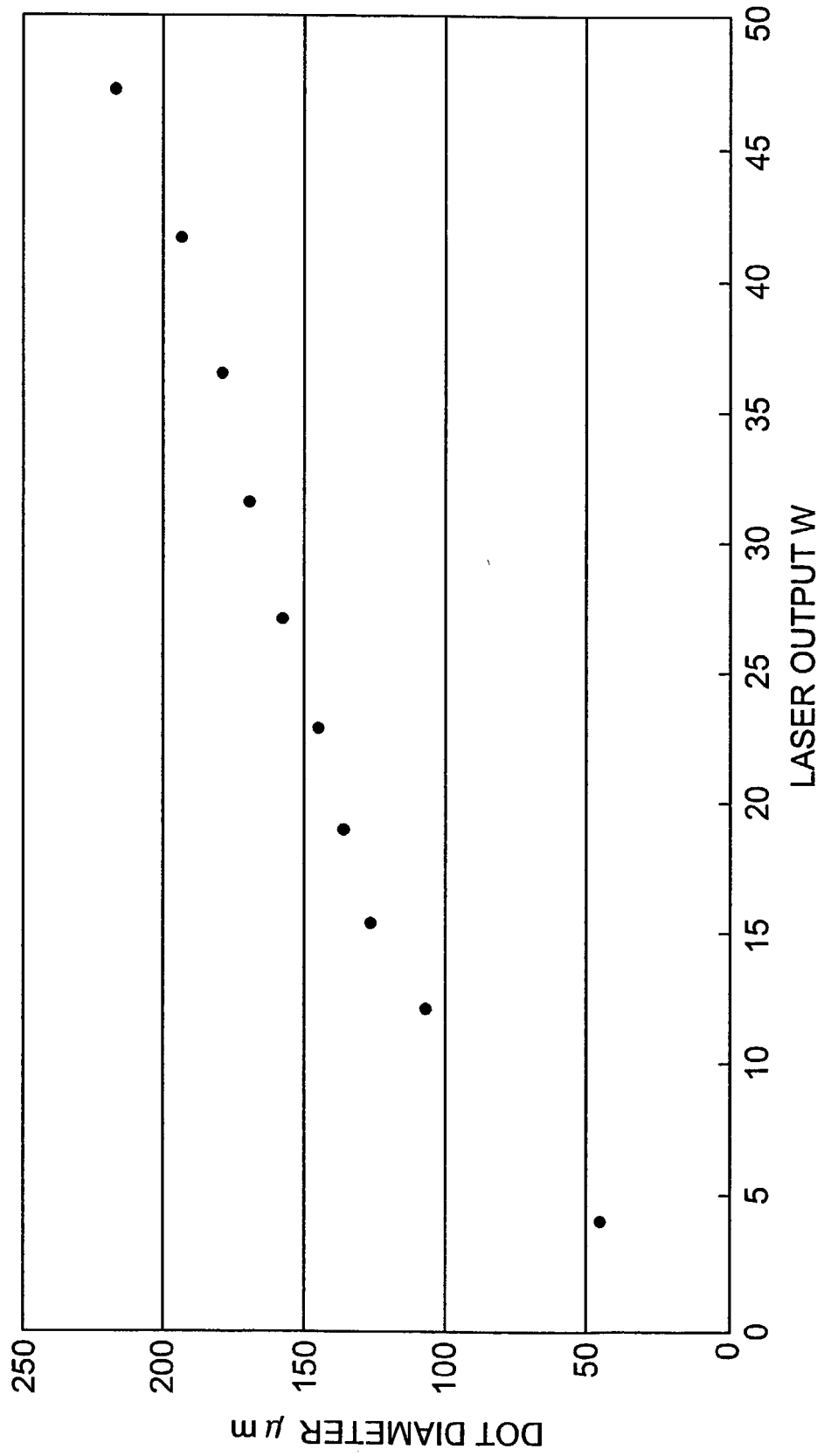
FIG. 8 is an explanatory diagram illustrating the relationship between the output of the laser and the diameter of the dot.

FIG. 5 is an explanatory view schematically illustrating a test apparatus used in a durability test of the contact surface between the base material and the fluorocarbon resin. FIG. 6 is an explanatory diagram in which the test results of an aluminum plane member with fluorocarbon resin coating which is used in the above test are plotted on a graph such that the diameter of the laser irradiation dot is plotted on a lateral axis and the space between the dots is plotted on a vertical axis. Incidentally, the graph shown in FIG. 6 is obtained by the laser irradiation using the pattern shown in FIG. 3A and by calculating the irradiation rate (irradiation density) of the laser irradiation from the diameter of the dot and the spacing between the dots. FIG. 7 is an explanatory diagram in which the data shown in FIG. 6 is rearranged such that the dot area is plotted on a lateral axis and the unit irradiation target area is plotted on a vertical axis. Furthermore, FIG. 8 is an explanatory diagram indicating the relationship between the output of the laser and the diameter of the dot.

An aluminum plane member T1 with a fluorocarbon resin coating was manufactured by the method of coating a fluorocarbon resin including the step of laser irradiation shown in FIG. 2. The aluminum plane member T1 was subjected to the test using the test apparatus shown in FIG. 5. As shown in FIG. 5, the resin-coated member T1 is brought into contact with an aluminum plane member T2 without fluorocarbon resin coating in a lubricating oil such that they face each other. The load L was applied on the contact surface between them in a vertical direction. In this case, the load L is increased stepwise while rotatably sliding the aluminum plane member T2 to make a judgment whether the coating is peeled off and seizing is caused.

The fluorocarbon resin coated aluminum plane members T1 (50 mm in diameter, 15 μm in coating thickness) were prepared as the respective test members in Table 1 under different laser irradiation conditions. However, these test members are manufactured under the same conditions except for the laser irradiation conditions.

The durability test was conducted on each of the invention products and the comparative products in Table 1 under the following test conditions.

Imposed load and time period: the load was imposed in increments of 500 N up to 5000 N for 50 minutes in total, e.g., a load of 500 N was imposed for 5 minutes, and an additional load of 500 N (i.e., 1000 N in total) was imposed for 5 minutes.

Rotational frequency: 4000 rpm.

The results of the test under such conditions did not show seizing in both the product of the invention and the comparative product. After completing the test up to 5000 N for 5 minutes, the surface of the member T1, on which the fluorocarbon resin was coated, was visually inspected to obtain the peeling amount of the coating. When the peeling amount of the coating was less than that of the side block of the current product prepared by shot-blasting, it was judged as good (O). When the peeling amount of the coating was greater than that of the side block of the current product prepared by shot-blasting, it was judged as no good (X).

The results of such judgments were plotted in FIGS. 6 and 7. As is evident from FIG. 6 and FIG. 7, the product of the present invention having an irradiation density (irradiation rate) of 44% or higher exhibits strong contact and adhesion properties of the fluorocarbon resin coating layer and an excellent durability. In the case of the control product having an irradiation density of less than 44%, the durability cannot be improved.

TABLE 1

|   | Dot diameter (μm) | Dot pitch (μm) | Irradiation rate (Irradiation density) (%) |
|---|---|---|---|
|   | Invention product | | |
| 1 | 158 | 195 | 51.3 |
| 2 | 169 | 195 | 59.2 |
| 3 | 179 | 195 | 66.0 |
| 4 | 194 | 195 | 77.4 |
| 5 | 217 | 195 | 97.4 |
| 6 | 161 | 195 | 53.5 |
| 7 | 161 | 215 | 44.0 |
| 8 | 149 | 195 | 45.8 |
| 9 | 189 | 233 | 51.7 |
| 10 | 45 | 50 | 63.6 |
| 11 | 158 | 178 | 61.6 |
|   | comparative product | | |
| 1 | 106 | 195 | 23.3 |
| 2 | 126 | 195 | 32.8 |
| 3 | 136 | 195 | 38.1 |
| 4 | 145 | 195 | 43.4 |
| 5 | 45 | 106 | 14.1 |

By the way, as shown in FIGS. 6 and 7, the relationship between the dot diameter d and the dot pitch p should be defined as $p \leq 1.336 \times d$ if the irradiation density (irradiation rate) was set to 44% or higher when the laser irradiation is performed such that the dots are arranged in a square arrangement in lateral and vertical directions where the adjacent dots were spaced so as to have equal pitches p. Furthermore, the relationship between the dot diameter d and the dot pitch p should be defined as $p \leq 1.436 \times d$ if the irradiation density (irradiation rate) was set to 44% or more when the laser irradiation is performed for placing the dots in a triangle arrangement where the spacing between adjacent dots were equally spaced so as to have equal staggered pitches P. For increasing the dot diameter d, there is a need to increase the output of the laser as shown in FIG. 8.

Thus, in the above invention products 1 to 9 and 11, the YAG laser was used. The output of the YAG laser can be increased. It is preferable to effectively perform the laser irradiation for roughening the substrate of fluorocarbon resin coating on the sliding surface with a comparatively large area such as the sliding surface of the side block, which is used under severe sliding conditions of large loading variation and a high maximum load.

In the above second embodiment using the laser irradiation, there is an advantage that the surface roughness can be easily adapted to a desired condition, as compared with the first embodiment that utilizes shot-blasting. Particularly, the adhesion property can be increased when the irradiation density (irradiation rate) of the laser irradiation is set to 44% or higher, so that it can be applied to a sliding member used under severe usage conditions.

Third Embodiment

Figure 9:
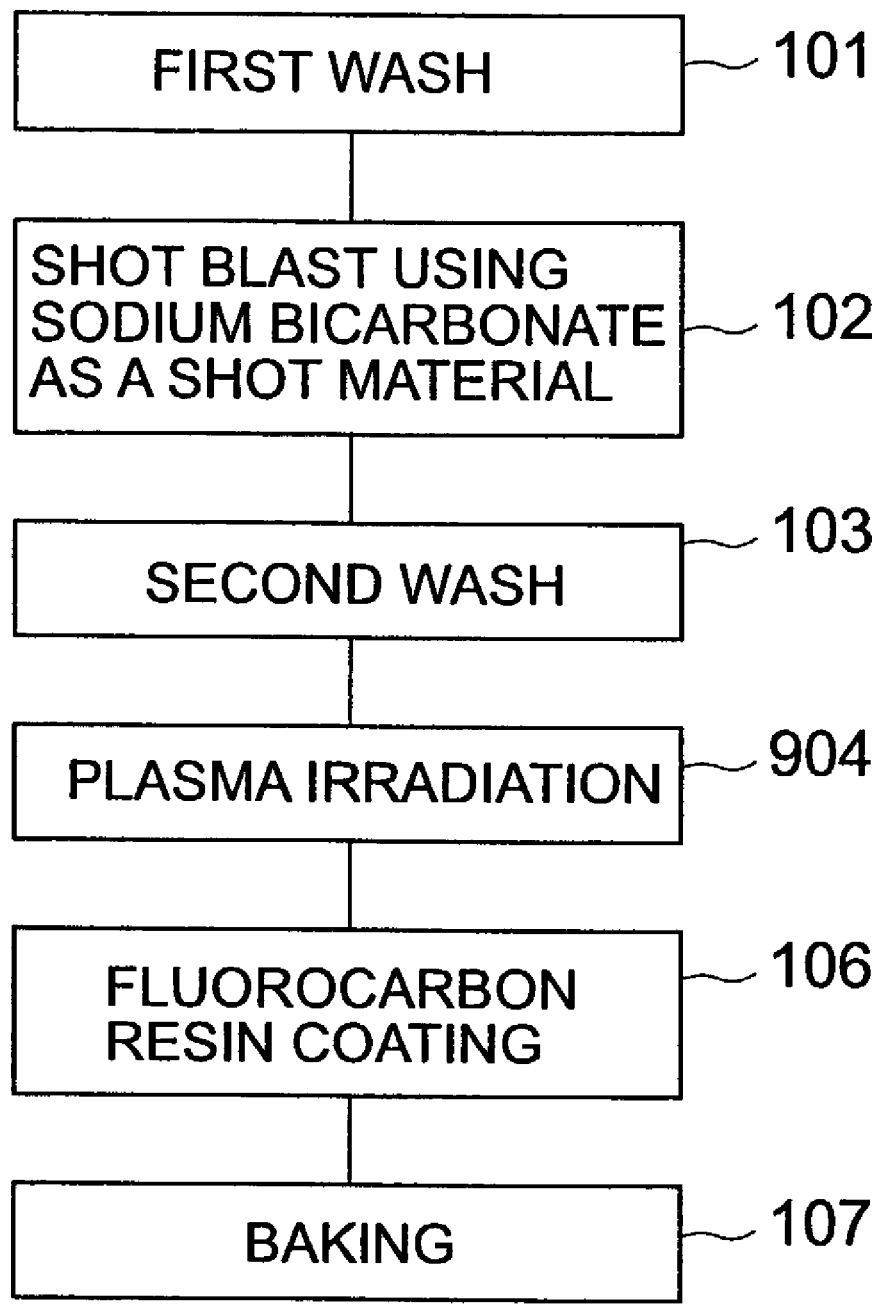
FIG. 9 is an explanatory diagram illustrating a processing flow for a method of coating a fluorocarbon resin in accordance with a third embodiment of the present invention.

FIG. 9 is a flow chart of a method of coating a fluorocarbon resin according to a third embodiment of the present invention.

In FIG. 9, just as in the case with FIG. 1, the first wash (101), shot-blasting using a shot material made of sodium bicarbonate $NaHCO_3$ (102), which is performed to roughen and clean the surface of the base material, and the second wash (103) are performed in this order.

Subsequently, a plasma irradiation is performed on the base material from which the shot material is perfectly removed by roughening and cleaning the surface (904). In the plasma irradiation, the flow of plasma particles generated from a plasma generator (not shown) is irradiated on the surface of the base material to be coated with a fluorocarbon resin coating to roughen the surface by forming minute atomic-level unevenesses on the surface and simultaneously activate the surface by the cleaning. The minute atomic-level unevennesses indicate unevennesses that are finer than those obtained by the shot-blasting described above.

Consequently, the plasma irradiation allows the surface of the base material to have markedly improved contact and adhesion properties with respect to the fluorocarbon resin which is made of a material different from the base material.

After the plasma irradiation, just as in the case with FIG. 1, the fluorocarbon resin coating can be completed through the steps of fluorocarbon resin coating (106) and baking (107).

After the steps described above, the binding between the surface of the base material made of an aluminum alloy and the fluorocarbon resin coated on the surface becomes extremely strong, so that the fluorocarbon resin coating layer can be prevented from peeling or detaching from the surface even when a heavy load due to a strong sliding movement or the like is received.

Furthermore, just as in the case with FIG. 1, there is no shot material that remains in the base material because the shot material has completely been drawn off of the base material using a washing liquid. Therefore, there is no possibility of damaging the sliding member or the like by the residual shot material flowing into the inside of the gas compressor in operation.

Consequently, the sliding member coated with the fluorocarbon resin and the gas compressor having such a sliding member exhibit an increased durability, an extended life time, and an increased reliability.

According to the third embodiment of the present invention, there is no need to perform chemical conversion treatment generally applied in the conventional method which generates noxious waste water, to provide large-scale and expensive extra facilities which are necessary for the chemical conversion treatment. The plasma irradiation step, which is provided instead of the chemical conversion treatment, can be easily incorporated in the line production system. In other words, the coating can be completed in a consistent manner within one coating treatment line.

Fourth Embodiment

Figure 10:
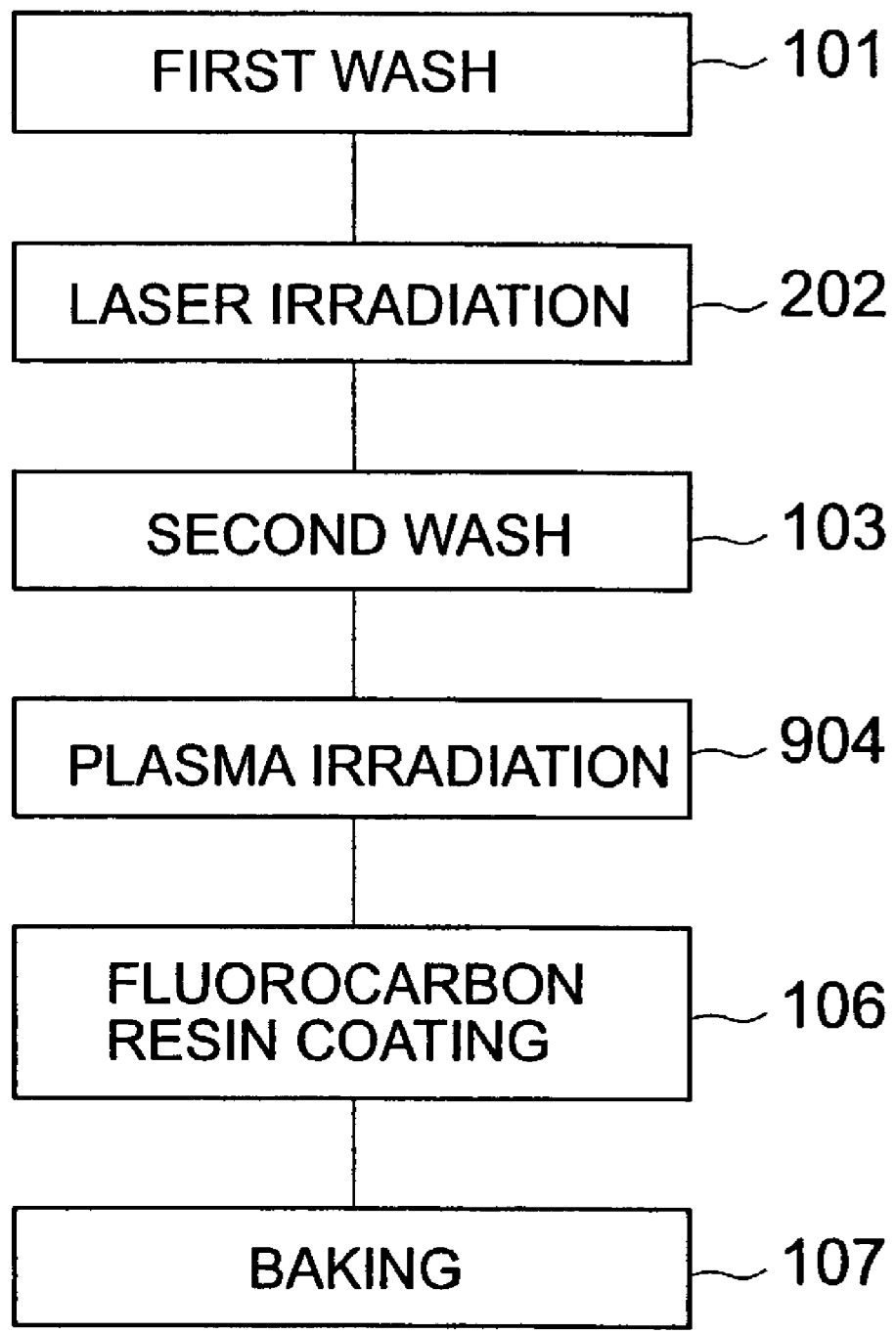
FIG. 10 is an explanatory diagram illustrating a processing flow for a method of coating a fluorocarbon resin in accordance with a fourth embodiment of the present invention.

FIG. 10 is a flow chart of a method of coating a fluorocarbon resin according to a forth embodiment of the present invention.

In FIG. 10, a laser irradiation step (202) is incorporated instead of the shot-blasting step (102) in FIG. 9. The intensity of laser light used in the laser irradiation step (202) is of such a magnitude that the surface of the base material can be slightly melted and roughened. In addition, pulse laser scans the entire surface to be irradiated. The irradiation rate of the laser irradiation is preferably 44% or higher.

The use of laser irradiation has an advantage in that the condition of the rough surface can be easily adapted to a desired one, as compared with the case of using the shot-blasting process.

With a plasma irradiation step (904) of FIG. 10, on the surface of the base material, there are further formed fine atomic-level unevennesses that are shallower than the recesses formed in the above laser irradiation step (202).

By such plasma irradiation, the surface of the base member exhibits markedly improved contact and adhesion properties with respect to the fluorocarbon resin that is made of a material different from the base member.

The gas compressor of this invention in which the above side block 7 is used will be described with reference to FIGS. 11 to 14.

Figure 11:
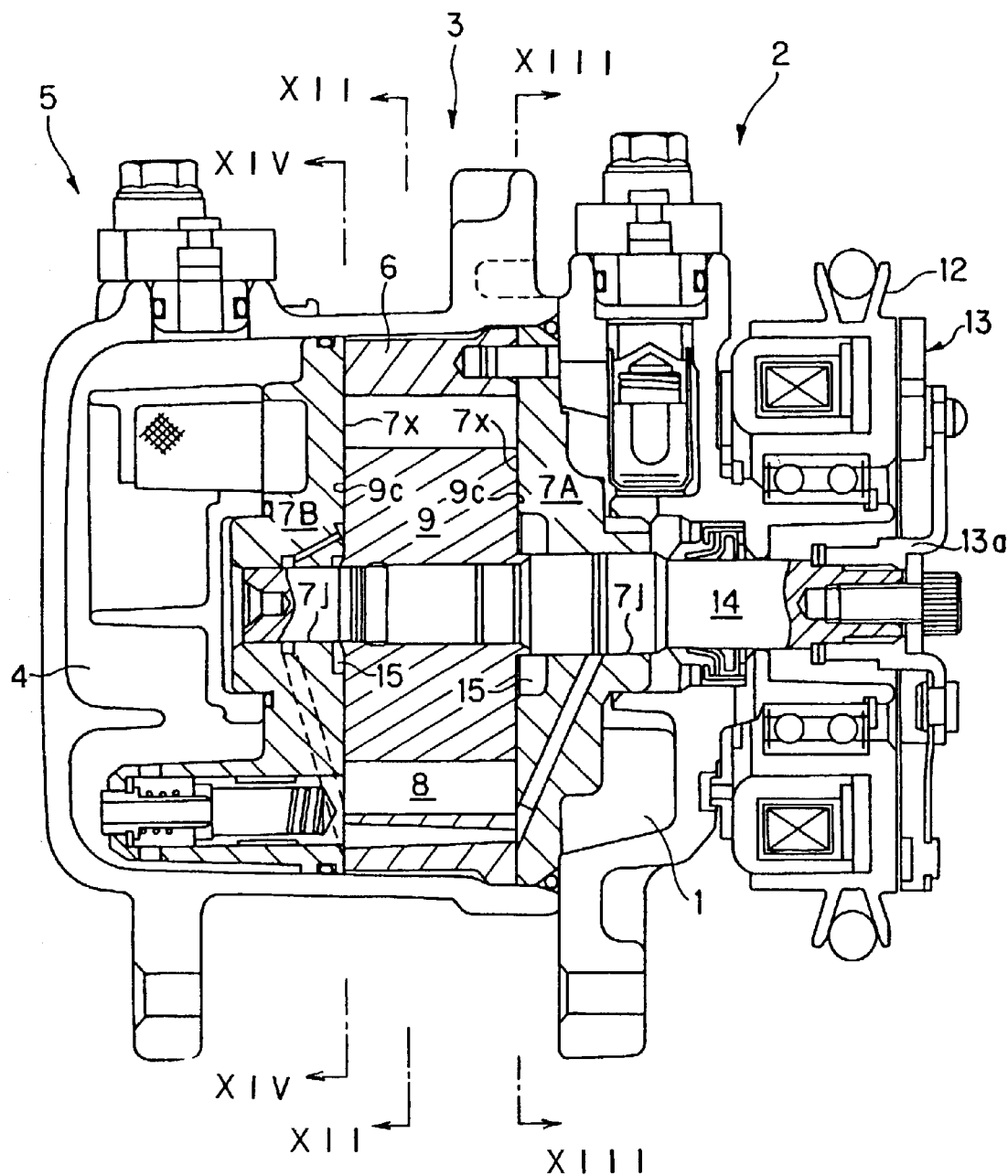
FIG. 11 is a vertical sectional view illustrating an embodiment of a gas compressor having a sliding member that is coated according to the method of coating a fluorocarbon resin of the present invention.
Figure 12:
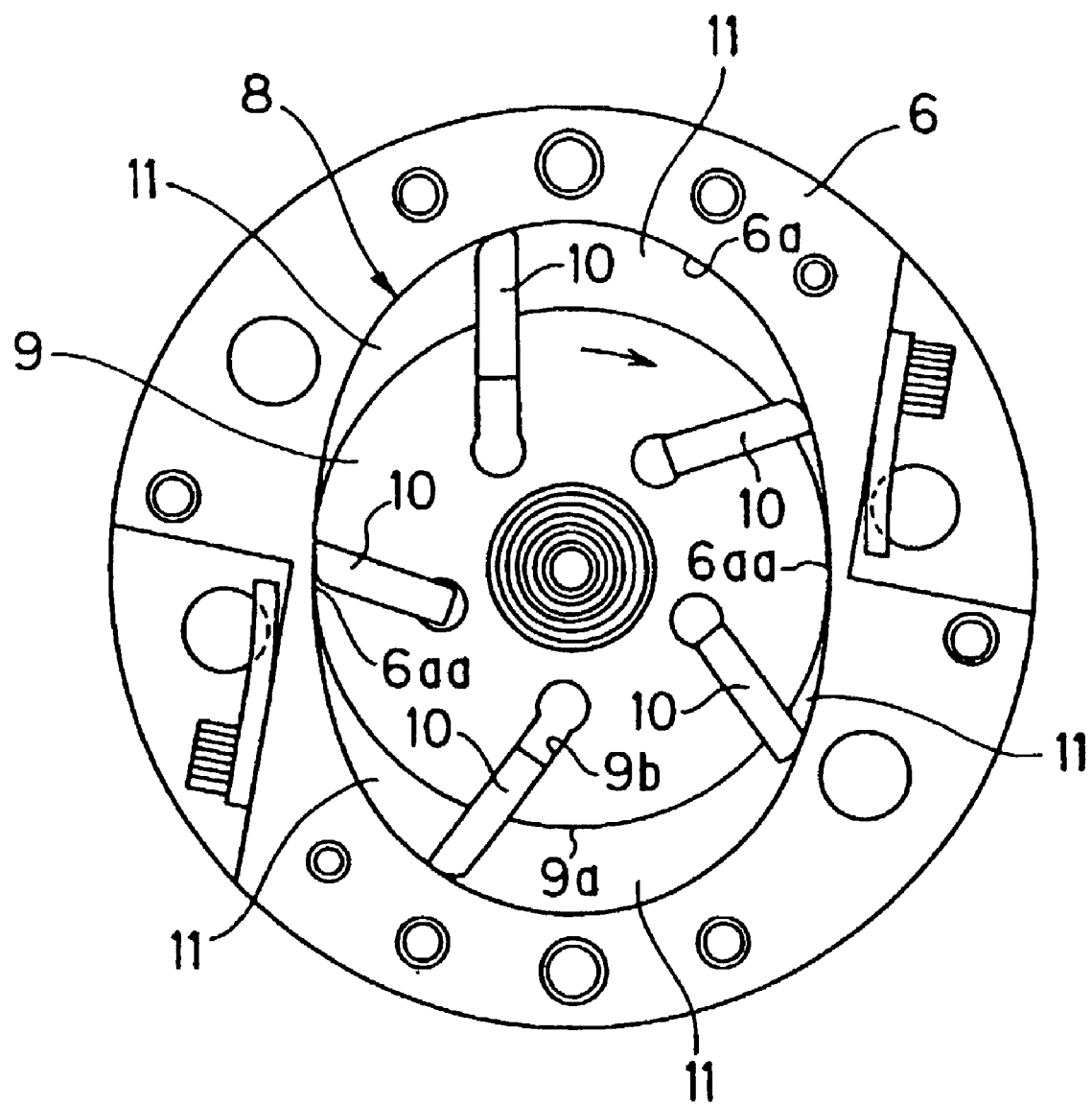
FIG. 12 is a cross sectional view taken along the line XII—XII in FIG. 11.
Figure 13:
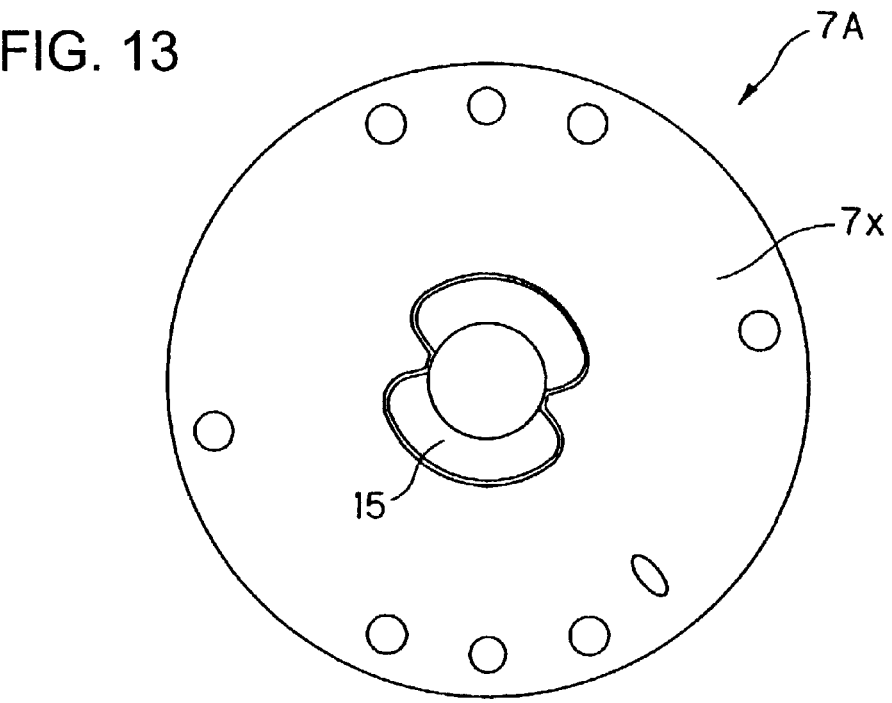
FIG. 13 is across sectional view taken along the line XIII—XIII in FIG. 11.
Figure 14:
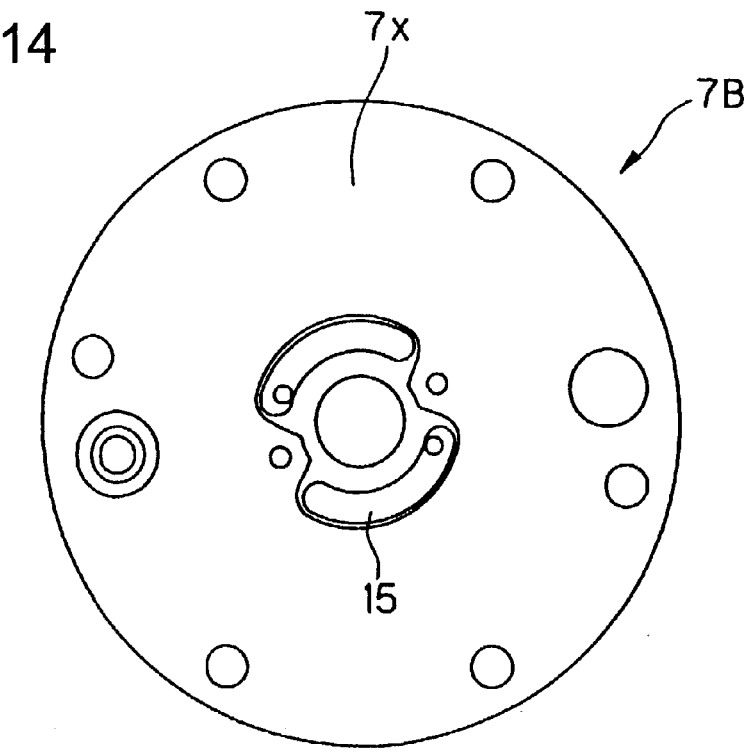
FIG. 14 is a cross sectional view taken along the line XIV—XIV in FIG. 11.

FIG. 11 is a vertical sectional view that illustrates a gas compressor according to an embodiment of the present invention. FIG. 12 is a cross sectional view taken along the line XII—XII in FIG. 11, illustrating the interior portion of a cylinder member. FIG. 13 is a cross sectional view taken along the line XIII—XIII in FIG. 11, illustrating the surface of the side block on the front side which makes contact with the cylinder chamber. FIG. 14 is a cross sectional view taken along the line XIV—XIV in FIG. 11, illustrating the surface of the side block on the rear side which makes contact with the cylinder chamber.

The gas compressor of this embodiment is of a well-known vane-rotary type and is comprised of a head part 2 having a suction chamber 1, a main part 3 of the compressor into which the gas before compression is introduced from the suction chamber 1 and compressed, and a rear part 5 having a discharge chamber 4 where the gas to be discharged which is compressed by the main part 3 of the compressor is housed.

The compressor main part 3 comprises a cylinder chamber 8 which is formed in the inside of a cylinder block 6 and end surfaces thereof are surrounded with side blocks 7A, 7B. A rotor is rotatably housed in the cylinder chamber 8. The rotor 9 comprises a plurality of vanes 10, 10. The tip of each of the vanes 10, 10 can be bounced in and off while sliding on an inner wall surface 6a of the cylinder block 6 as the rotor 9 rotates about its rotation axis. The cylinder chamber 8 is divided into a plurality of compression chambers 11, 11 by being partitioned by the rotor 9 and the vanes 10, 10. The respective compression chambers 11 inhale the gas from the suction chamber 1 in succession. Then, the gas is compressed by the rotary motion of the rotor 9, followed by being discharged into the discharge chamber 4.

Incidentally, the rotor 9 is designed such that it can be rotated by a rotary power of an engine shaft (not shown) of the vehicle through a driving pulley 12, an electromagnetic clutch 13, and a rotary shaft 14 which are provided in the head part 2. The rotary shaft 14 is fixed so as to penetrate through the center of each of the rotor 9 and a coupled driving part 13a of the electromagnetic clutch 13 and rotatably supported by bearing parts 7j, 7j of the respective side blocks 7A, 7B.

When the rotor 9 rotates, the tip of the vane 10 and the inner wall surface 6a of the cylinder block 6 can be slid on each other. The outer peripheral surface 9a of the rotor 9 and a short diameter part of the inner wall surface 6a of the cylinder block 6 can be slid on each other. In addition, the side surface of a vane groove 9b of the rotor 9 and the side surface of the vane 10 are slid on each other. In addition, the side surface of a vane groove 9b of the rotor 9 and the side surface of the vane 10 are slid on each other. Both end surfaces 9c, 9c of the rotor 9 and the surfaces 7x, 7x of the respective side blocks 7A, 7B which oppose the cylinder chamber are slid on each other. Furthermore, both end surfaces of the vane 10 and the surfaces 7x, 7x of the respective side blocks 7A, 7B which oppose the cylinder chamber are slid on each other. Furthermore, the cylinder block 6, the side blocks 7A, 7B, the rotor 9, and the vane 10 are made of aluminum alloy for weight reduction.

The sliding surface of each of them may be supplied with a lubricating oil. However, the pressure difference between one compression chamber 11 and the other compression chamber 11 which repeat the inhalation of gas and the compression of gas is large. When a leakage of gas occurs between the compression chambers due to such a large pressure difference, the efficiency of compression decreases as the amount of power loss corresponds to the amount of leakage. Thus, the gap for each sliding surface is designed to be as small as possible, so that the solid contact can be easily caused as a lubricating oil film is broken.

Thus, these sliding surfaces maybe coated with a fluorocarbon resin such as polytetrafluoroethylene on one of the sliding surfaces. Then, the coated surface is faced with the sliding surface of the opposite aluminum alloy to increase the wear resistance and the anti-seizing properties.

For preventing the fluorocarbon resin of the compressor in operation from being peeled or detached, there is a need to securely contact or adhere an aluminum alloy with the fluorocarbon resin. For improving the contact and adhesion properties, steps including the treatment of a base material shown in FIG. 15 have been adapted as previously explained in the description of prior art.

In this embodiment, for securely contacting and adhering the coating layers of the sliding surfaces that experience high sliding load with respect to both side blocks 7A, 7B, the rotor 9 and the vane 10 in particular, the coating was performed as follows. That is, polytetrafluoroethylene was coated on the surfaces 7x, 7x of both the side blocks 7A, 7B which oppose the cylinder chamber, using the coating method shown in FIG. 1, FIG. 2, FIG. 9, or FIG. 10. In the surface 7x facing the cylinder chamber, as shown in FIGS. 13 and 14, a recessed portion 15, pores, or the like is formed for application of vane back pressure. Although the coating substrate treatment such as shot-blasting may also affect surface of such a recessed portion, pores, or the like, there is no possibility of generating residual shot-materials, so that the recessed portion, pores, or the like can be perfectly cleaned in the washing step.

There is no residual shot material generation in both the steps of using a shot material made of sodium bicarbonate or dry ice as in FIG. 1 or FIG. 9 and using laser irradiation as in FIG. 2 or FIG. 10. In addition, each of these steps provides a polytetrafluoroethylene coating layer that can be securely contacted or adhered onto the aluminum alloy, thus allowing its application to practical use.

When utilizing the step of using the plasma irradiation shown in FIG. 9 or FIG. 10, the surfaces 7x, 7x of the respective side blocks 7A, 7B which oppose the cylinder chamber can be finely roughened and cleaned at an atomic level and activated by means of plasma irradiation, allowing extremely firm contact or adhesion with polytetrafluoroethylene.

The fluorocarbon resins which can be used for fluorocarbon resin coating of the present invention may be a low-molecular weight ethylene tetrafluoride resin, an ethylene tetrafluoride-propylene hexafluoride copolymer resin, a vinylidene fluoride resin, an ethylene chloride trifluoride resin, or the like, in addition to polytetrafluoroethylene.

In the above embodiments, the step of chemical conversion treatment or the step of plasma irradiation is performed before the step of applying fluorocarbon resin. If the application of fluorocarbon resin can be performed on a sliding part receiving a comparatively small sliding load or immediately after cleaning the surface of the base material in the second wash before it becomes dirty, the step of chemical conversion treatment or plasma irradiation may be omitted. Since the chemical conversion treatment requires a specific facility, the omission of the conversion enables the coating to be completed in a consistent manner within one coating treatment line.

According to the method of coating a fluorocarbon resin, as described above, in the substrate treatment of the surface of the base material to be coated, the surface of the coating target work piece is subjected to the shot-blasting using a water-soluble shot material such as sodium bicarbonate or a vaporizable shot material such as dry ice. The surface of the coating target work piece is irradiated with the laser light, so that the surface can be roughened and cleaned to increase the adhesion between the surface and the fluorocarbon resin coating layer which can be applied on the surface. Therefore, there is no possibility that the shot material remains in the base material in the vicinity of the fluorocarbon resin coating layer. Also, there is no possibility of any damage being caused to the coating layer or base material by the residual shot member when it is rubbed against other members.

Furthermore, the contact or adhesion between the base material and the fluorocarbon resin can be further improved by the addition of the fine roughening and cleaning step of finely roughening and cleaning the roughened surface of the base material by means of plasma irradiation or the like, so that a strong fluorocarbon resin coating with a high durability and a high reliability can be realized.

Furthermore, since the method of the present invention includes the steps described below, minute irregularities are formed in the surface of the coating substrate, so that the fluorocarbon resin coating can be more securely adhered to the surface of the coating target work piece and is hardly peeled off. That is, the method includes the following steps of:

1) roughening the surface of the coating target work piece by locally heating and melting the surface by means of laser irradiation or the like;

2) coating the fluorocarbon resin on the surface of the coating target work piece which has been thus roughened by heating and melting; and 3) baking the coating surface of the coating target work piece on which the fluorocarbon resin has been applied by the above step of coating the fluorocarbon resin.

In the laser irradiation step, the proportion of irradiated dots (rough surface portion) on the substrate can be increased when the irradiation rate of the laser irradiation is set to 44% or higher. Thus, the fluorocarbon resin coating can be firmly adhered onto the surface of the coating target work piece despite the short irradiation time, so that it does not easily peel off and also can withstand severe usage conditions.

Furthermore, the plasma irradiation is performed on the surface of the coating target work piece in the substrate treatment step to clean the surface of the target while finely roughening such a surface at an atomic level to activate the surface. Therefore, the fluorocarbon resin can be coated on the surface having thus enhanced contact and adhesion properties. In other words, the chemical conversion treatment which has been required in the conventional method is not required in the present invention, so that there is no need to provide any waste water processing facilities for processing noxious waste water that is generated in the chemical conversion treatment. Therefore, dramatic cost reduction can be realized. Also, the fear of environmental pollution occurring due to leakage of the waste water or the like can be completely eliminated.

The plasma irradiation step can be incorporated into the fluorocarbon resin coating step, thus enabling a drastic increase in production efficiency.

Therefore, the life time of each of the sliding member having the sliding surface coated with the fluorocarbon resin coating and the gas compressor having such a sliding member having the sliding surface coated with the fluorocarbon resin coating can be extended to realize enhanced reliability.

What is claimed is:

1. A method of coating a fluorocarbon resin on a surface of a first member made of aluminum or aluminum alloy and configured to undergo sliding contact with a surface of a second member, comprising the steps of:

roughening the surface of the first member by irradiating the surface of the first member with a laser to form a plurality of first recesses thereon;

cleaning the surface of the first member after the roughening step;

finely roughening the surface of the first member after the cleaning step by irradiating the first recesses on the surface of the first member with a plasma to form a plurality of second recesses which are shallower than the first recesses;

coating a fluorocarbon resin on the surface of the first member after the finely roughening step so that the fluorocarbon resin securely contacts and adheres to the surface of the first member due to the rough and clean state of the surface of the first member; and heating the surface of the first member after coating the fluorocarbon resin.

2. A method according to claim 1; wherein the roughening step comprises the step of intermittently irradiating the laser on the surface of the first member while scanning the laser thereon to thereby roughen the surface of the first member.

3. A method according to claim 2; wherein the scanning step comprises the step of scanning the laser on the surface of the first member along a scanning line having a spiral form.

4. A method according to claim 1; wherein the roughening step comprises the step of irradiating the laser at an irradiation rate of 44% or higher.

5. A method according to claim 1; wherein the roughening step comprises the step of irradiating the surface of the first member with a YAG laser.

6. A method according to claim 1; wherein the roughening step comprises the step of irradiating the surface of the first member with a laser having sufficient intensity to melt and roughen the surface so that shallow recesses are formed on the surface.

7. A method according to claim 6; wherein the shallow recesses are arranged two-dimensionally at substantially equal pitches.

* * * * *